United States Patent
Baer

(10) Patent No.: US 8,988,504 B2
(45) Date of Patent: Mar. 24, 2015

(54) IMAGING SYSTEMS WITH INTEGRATED STEREO IMAGERS

(75) Inventor: Richard L. Baer, Los Altos, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1158 days.

(21) Appl. No.: 12/793,645

(22) Filed: Jun. 3, 2010

(65) Prior Publication Data

US 2011/0298892 A1    Dec. 8, 2011

(51) Int. Cl.
*H04N 13/02* (2006.01)
*H04N 5/353* (2011.01)
*H04N 5/374* (2011.01)

(52) U.S. Cl.
CPC .......... *H04N 13/0239* (2013.01); *H04N 5/3532* (2013.01); *H04N 5/3742* (2013.01)
USPC .............................................. 348/46; 348/45

(58) Field of Classification Search
None
See application file for complete search history.

(56) References Cited

U.S. PATENT DOCUMENTS

| | | | |
|---|---|---|---|
| 4,862,873 A | 9/1989 | Yajima et al. | |
| 4,914,521 A * | 4/1990 | Adair | 348/375 |
| 5,122,650 A | 6/1992 | McKinley | |
| 5,191,203 A | 3/1993 | McKinley | |
| 5,510,832 A | 4/1996 | Garcia | |
| 5,673,146 A | 9/1997 | Kelly | |
| 5,751,341 A | 5/1998 | Chaleki et al. | |
| 5,944,655 A | 8/1999 | Becker | |
| 5,963,369 A | 10/1999 | Steinthal et al. | |
| 6,222,589 B1 * | 4/2001 | Faroudja et al. | 348/448 |
| 6,606,113 B2 | 8/2003 | Nakamura | |
| 7,075,735 B2 | 7/2006 | Nozawa et al. | |
| 7,112,774 B2 * | 9/2006 | Baer | 250/208.1 |
| 8,305,624 B2 * | 11/2012 | Mitobe et al. | 358/1.16 |
| 2007/0156017 A1 | 7/2007 | Lamprecht et al. | |
| 2008/0039686 A1 * | 2/2008 | Mori et al. | 600/109 |
| 2010/0123771 A1 * | 5/2010 | Moon et al. | 348/46 |

* cited by examiner

*Primary Examiner* — Mehrdad Dastouri
*Assistant Examiner* — James Anderson, II
(74) *Attorney, Agent, or Firm* — Treyz Law Group; Joseph Guihan

(57) ABSTRACT

An imaging system may include an integrated stereo imager that includes first and second imager arrays on a single integrated circuit. Image readout circuitry may be located between the first and second imager arrays and a horizontal electronic rolling shutter may be used to read image data out of the arrays. The layout of the arrays and image readout circuitry on the integrated circuit may help to reduce the size of the integrated circuit while maximizing the baseline separation between the arrays. Memory buffer circuitry may be used to convert image data from the arrays into raster-scan compliant image data. The raster-scan compliant image data may be provided to a host system.

15 Claims, 6 Drawing Sheets

IMAGING SYSTEMS WITH INTEGRATED STEREO IMAGERS

BACKGROUND

This relates to imaging systems and, more particularly, to imaging systems with integrated stereo imagers.

Digital cameras and other electronic devices use digital camera modules to capture video and still digital images. A typical camera module includes an imager (i.e., a camera sensor) and associated image processing circuitry.

Stereo imaging is becoming increasingly popular. Conventional stereo imaging systems include two discrete imagers, each of which is on a separate integrated circuit. By requiring two discrete integrated circuits, the cost and complexity of the conventional stereo imaging systems is high. In addition, conventional stereo imaging systems are undesirably large. The large size of conventional stereo imaging systems makes them undesirable for use in various small-form factor applications such as medical endoscopes.

It would therefore be desirable to provide imaging systems with integrated stereo imagers.

DETAILED DESCRIPTION

Figure 1:
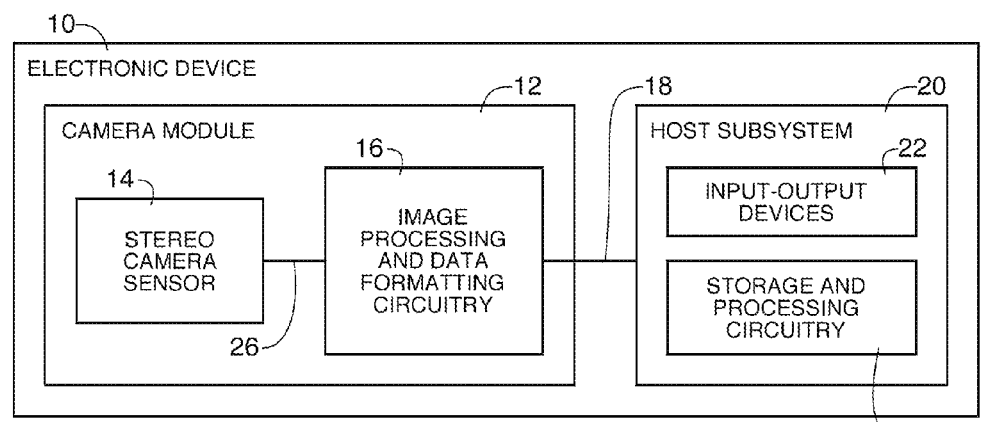
FIG. 1 is a diagram of an illustrative electronic device that may include a camera module with a stereo camera sensor in accordance with an embodiment of the present invention.

An electronic device with a digital camera module is shown in FIG. 1. Electronic device 10 may be a digital camera, a computer, a cellular telephone, a medical device such as an endoscope, or other electronic device. Camera module 12 may include stereo image sensor 14 (e.g., a pair of image sensors that work together as a stereoscopic image sensor) and one or more lenses. During operation, the lenses focus light onto stereo image sensor 14. The pixels in each of the image sensors in stereo image sensor 14 include photosensitive elements that convert the light into digital data. Image sensors may have any number of pixels (e.g., hundreds, thousands, millions, or more). A typical image sensor may, for example, have millions of pixels (e.g., megapixels). In high-end equipment, sensors with 10 megapixels or more are not uncommon. Compact electronic devices such as some medical endoscopes may, as an example, include thousands of pixels.

Still and video image data from stereo camera sensor 14 may be provided to image processing and data formatting circuitry 16 via path 26. Image processing and data formatting circuitry 16 may be used to perform image processing functions such as data formatting (e.g., converting non-raster-scan image and video data into raster-scan compliant image and video data), adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, stereo camera sensor 14 and image processing and data formatting circuitry 16 are implemented on a common integrated circuit. The use of a single integrated circuit to implement stereo camera sensor 14 and image processing and data formatting circuitry 16 can help to minimize costs.

Camera module 12 conveys acquired image data to host subsystem 20 over path 18 (e.g., image processing and data formatting circuitry 16 conveys acquired image data from sensor 14 to host subsystem 20). Electronic device 10 typically provides a user with numerous high level functions. In a computer or advanced cellular telephone, for example, a user may be provided with the ability to run user applications. When electronic device 10 is used in implementing a device such as a medical endoscope, a user may be provided, as examples, with the ability to view images from stereo sensor 14, control stereo sensor 14, and control physical manipulators in the endoscope (e.g., cutter tools, gripping tools, cauterizing tools, etc.). To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Figure 2:
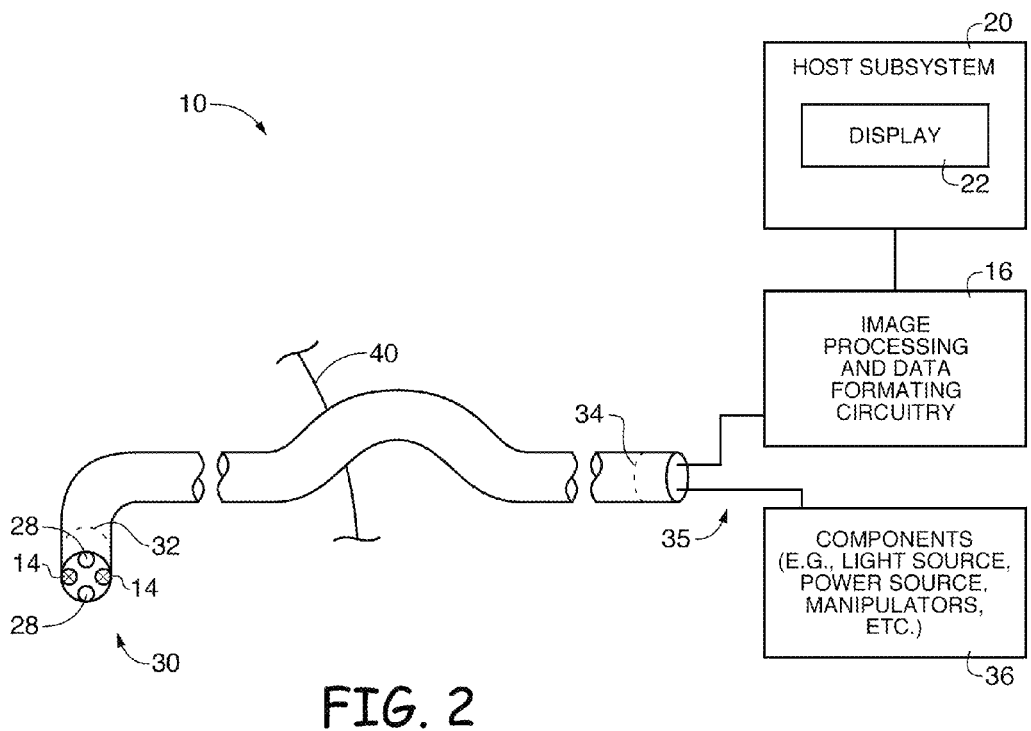
FIG. 2 is a diagram of an illustrative embodiment of the present invention in which the stereo camera sensor is a part of a device such as a medical endoscope.

FIG. 2 illustrates an embodiment in which device 10 is a medical endoscope that can be used to see inside a patient such as patient 40. Medical endoscopes are known to reduce the size of incisions (openings) in a body's patient body that are required for an operation, relative to conventional "open" surgeries. Medical endoscopes may have an elongated housing (e.g., a snake-like structure) that can be inserted into a patient's body during various medical procedures.

As shown in FIG. 2, stereo camera sensor 14 and optional ports 28 may be located in the distal end of endoscope 10. Ports 28 may allow the insertion of manipulators (e.g., cutter tools, gripping tools, cauterizing tools, etc.) into patient 40, may allow the passage of illuminating light to provide illumination so that stereo sensor 14 can image the interior of the patient, and may facilitate other desired functions.

Stereo camera sensor 14 and polls 28 may be connected to image processing and data formatting circuitry 16 and components 36 by paths 35. Paths 35 may include; as examples, conductive lines (e.g., one or more data paths), optical fibers, mechanical linkages, power lines, and other types of paths. Paths 35 may also include connectors for separating and connecting disposable and non-disposable portions of device 10.

If desired, endoscope 10 may include disposable portions. As a first example, the distal tip of endoscope 10 may be detachable and disposable (as shown by dotted line 32). As a second example, all of the portions of endoscope 10 that enter a patient's body may be detachable and disposable (as shown by dotted line 34). These are merely examples and, in general, any desired portions of endoscope 10 may be disposable or may be reusable. Endoscope 10 may be formed from material that allow heat sterilization of endoscope 10

If desired, multiple integrated circuits may be used to implement the circuitry of camera module 12. As an example, stereo camera sensor 14 may be implemented on a first integrated circuit (e.g., in a disposable portion of device 10) and image processing and data formatting circuitry may be implemented on a second integrated circuit (e.g., in a reusable portion of device 10). The first and second integrated circuits can be connected together over path 26 (FIG. 1). The use of separate integrated circuits to implement stereo camera sensor 14 and image processing and data formatting circuitry 16 can help to minimize costs when the integrated circuit that implements stereo camera sensor 14 is used in a disposable fashion. For example, when device 10 is part of an endoscope as shown in the embodiment of FIG. 2, the integrated circuit that implements stereo camera sensor 14 may be located in the distal end of the endoscope (e.g., the portion of the endoscope inserted into a patient). Integrated circuits that implement stereo camera sensor 14, or even the entire portion of the endoscope that is inserted into a patient, may be disposable and may only be used for a single medical procedure. Following each procedure, the disposable portions may be thrown away and replaced with new disposable portions, thereby facilitating sterilization of the endoscope for the next patient. Because image processing and data formatting circuitry 16 is not located on the integrated circuit that implements stereo camera sensor 14 (in this example), the cost of the disposable portions is reduced.

Figure 3:
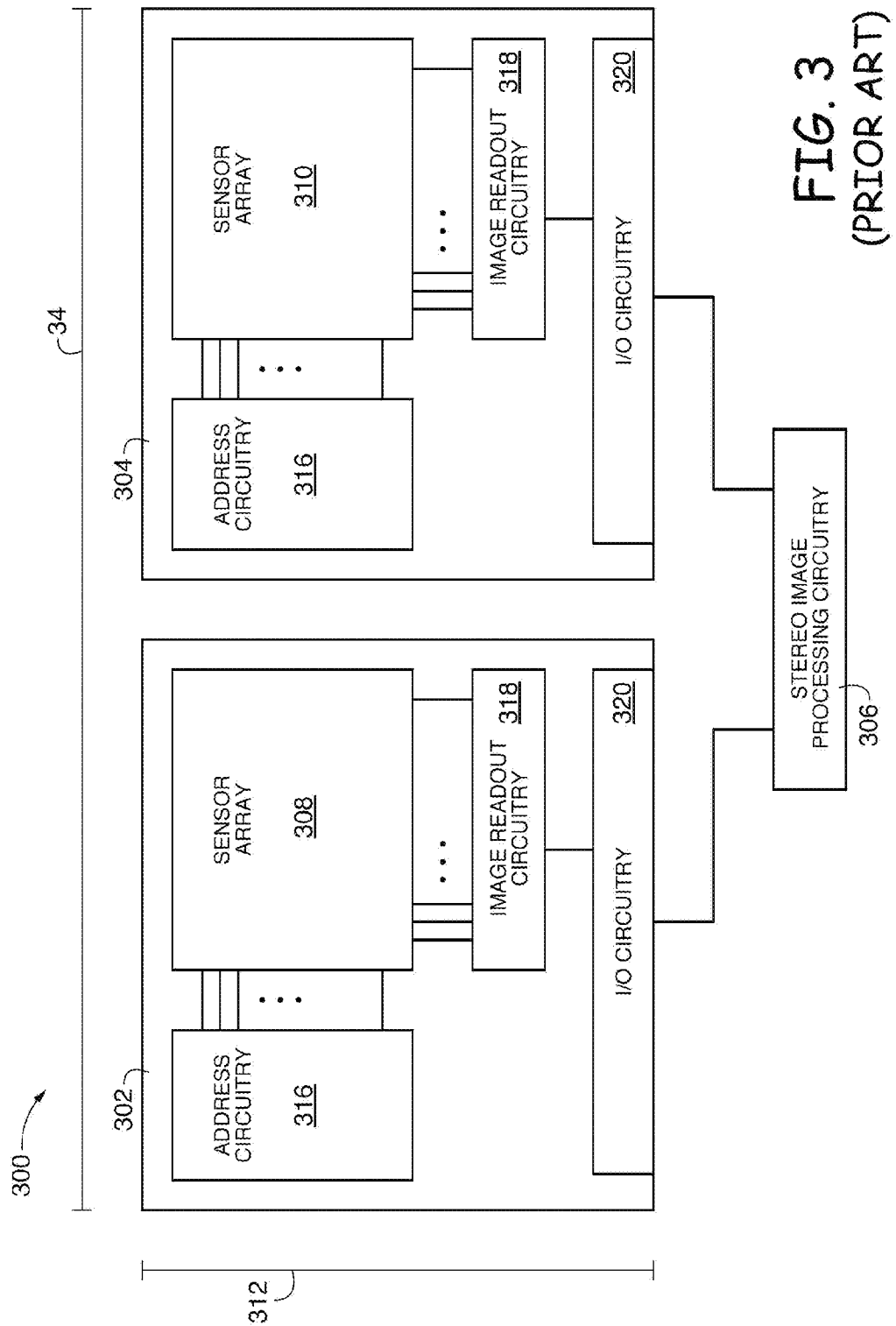
FIG. 3 is a diagram of a conventional stereo camera sensor that includes a pair of sensor arrays on separate integrated circuits.

A conventional stereo camera module 300 is shown in FIG. 3. Stereo camera module 300 includes integrated circuit 302 with a first sensor array 308, integrated circuit 304 with a second sensor array 310, and stereo image processing circuitry 306 that combines image data from arrays 308 and 310. While not to scale, FIG. 3 illustrates the relative positions of components in a conventional stereo camera module 300.

Address circuitry 316 drives address signals onto sensor arrays 308 and 310. The address signals connect a specific row of pixels to image readout circuitry 318. Image readout circuitry 318 reads out image data from the pixels of arrays 308 and 310. I/O circuitry 320 transmits the image data to stereo image processing circuitry 306.

The layout of integrated circuits 302 and 304 (e.g., the relative positions of sensor arrays 308 and 310, address circuitry 316, image readout circuitry 318, and input-output (I/O) circuitry 320) tends to make the conventional stereo module 300 have an undesirably large area (e.g., shown as width 314 and height 312). The excessive size of conventional stereo module 300 is especially undesirable in arrangements in which compactness is desirable (e.g., in medical endoscopes).

Figure 4:
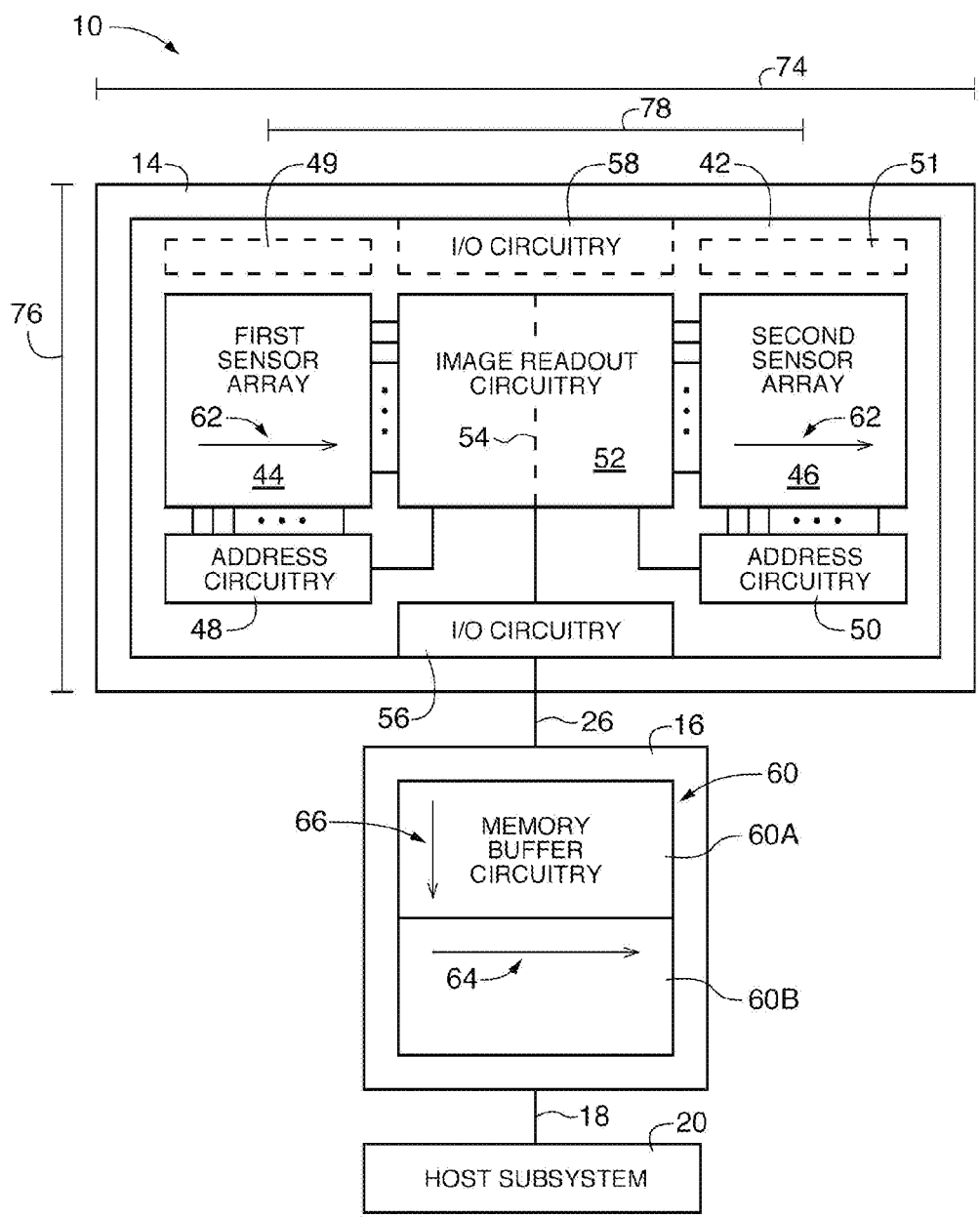
FIG. 4 is a diagram of an illustrative integrated stereo sensor array having a pair of sensor arrays in accordance with an embodiment of the present invention.

The layout of an illustrative integrated stereo sensor having a pair of sensor arrays is shown in FIG. 4. As shown in FIG. 4, stereo camera sensor 14 may include first sensor array 44 (sometimes referred to herein as a lea sensor array) and second sensor array 46 (sometimes referred to herein as a right sensor array).

Sensor arrays 44 and 46 may be formed on a single integrated circuit such as integrated circuit 42. Integrated circuit 42 may also include circuitry such as address circuitry 48 and 50, image readout circuitry 52, and input-output (I/O) circuitry 56, as examples. Integrated circuit 42 can also include other circuitry. If desired, image processing and data formatting circuitry 16 can be implemented on integrated circuit 42.

Address circuitry 48, which may also be referred to as address generator circuitry, generates address signals (e.g., column select signals, reset signals, transfer signals, etc.) that control transistors such as reset transistors, transfer transistors, and column select transistors (i.e., read select transistors) in the imaging pixels of array 44. Address circuitry 50 generates address signals that control transistors in the imaging pixels of array 46. When column select transistors in a column of pixels are turned on, the column select transistors couple nodes in the imaging pixels to image readout circuitry 52 to allow image data to be read out of the pixels in that column. Address circuitry 48 and 50 can generate address signals that selectively connect a single column of imaging pixels in array 44 and/or array 46 to image readout circuitry 52 (e.g., in an electronic rolling reset or electronic rolling shutter operation) or, if desired, address circuitry 48 and 50 can generate address signals that simultaneously connect all of the imaging pixels in array 44 and/or array 46 to image readout circuitry 52 (e.g., in a global reset or global shutter operation). In general, address circuitry 48 may operate independently or in sync with address circuitry 50. If desired, address circuitry 48 and 50 may be located in the locations of outlines 49 and 51 or additional address circuitry may be located in the locations of outlines 49 and 51. As examples, address circuitry 48 and 50 may generate column select signals, reset signals, transfer signals, etc.

Image readout circuitry 52 may read out image signals from the imaging pixels in arrays 44 and 46. If desired, image readout circuitry 52 may implement a correlated double sampling technique in which a reset signal is measured, an image signal is measured, and the reset signal is subtracted from the image signal to reduce noise. If desired, image readout circuitry 52 may be split into a first circuit associated with array 44 and a second circuit associated with array 46 (as illustrated by dotted line 54). As examples, image readout circuitry 52 may include sample and hold circuitry (for implementing correlated double sampling), reset drivers (for providing a reset voltage on a reset line), read circuitry, amplifiers such as variable gain analog amplifiers, analog-to-digital converters (ADC), etc. If desired, image readout circuitry 52 may include a single ADC for every row in array 44 and a single ADC for every row in array 46. With other arrangements, image readout circuitry 52 may include multiplexers or other switching circuitry to connect multiple rows of imaging pixels (e.g., 2 rows, 4, rows, 8 rows, etc.) to each ADC in circuitry 52. If desired, ADC's may be connected to both arrays 44 and 46 using a multiplexer or other switching circuitry.

I/O circuitry 56 may convey image data from image readout circuitry 52 to image processing and data formatting circuitry 16. I/O circuitry 56 may receive control signals from image processing and data formatting circuitry 16 (or other circuitry in camera module 12) and may provide the control signals to address circuitry 48 and 50 and image readout circuitry 52. These are merely illustrative examples of the type of functionality provided by I/O circuitry 56. If desired, I/O circuitry 56 may be located in the location of outline 58 or additional I/O circuitry may be located in the location of outline 58 (as examples).

The layout of integrated circuit 42 may help to minimize the width and height of integrated circuit 42. In particular, relative to the conventional arrangement of FIG. 3, the arrangement of FIG. 4 decreases the overall width 74 and height 76 of stereo camera sensor 14 (and integrated circuit 42) while increasing the physical separation (i.e., stereo baseline) between arrays 44 and 46. This type of arrangement may reduce cost and may be especially beneficial in devices where a compact form factor is preferred (such as medical endoscopes as discussed in connection with FIG. 2). As an example, the baseline separation (roughly illustrated by distance 78) between arrays 44 and 46 may be less than 0.3 cm, less than 0.4 cm, less than 0.5 cm, less than 1.0 cm, less than 2.0 cm, less than 3.0 cm, less than 5.0 cm, less than 10.0 cm, less than 20 cm, or larger than 20 cm. These types of arrangements may best provide three-dimensional images at ranges (e.g., distances in the line of sight of and away from image sensor 14) of closer than 0.3 cm, closer than 0.4 cm, closer than 0.5 cm, closer than 1.0 cm, closer than 2.0 cm, closer than 3.0 cm, closer than 5.0 cm, closer than 10.0 cm, closer than 20 cm, or further that 20 cm.

In general, stereo camera sensor 14 may operate using a global shutter, an electronic rolling shutter, or any other desired shutter technique. In a global shutter arrangement, all of the pixels in an array such as array 44 or array 46 are reset simultaneously, exposed for a period of time (referred to herein as an exposure time or an integration time) during which charge builds up on the pixels, and then the built-up charge (i.e., image data) is read out from the pixels. In an electronic rolling shutter, individual columns of pixels are reset individually over time (e.g., the $n_{th}$ column of pixels is reset at $t_1$, the $n_{th}+1$ column is reset at $t_1+t_i$, the $n_{th}+2$ column is reset at $t_1+2^* t_i$, etc.), each column of pixels is then exposed for a period of time (each column being exposed for the same period of time, but during slightly different times), and the built-up charge is read out from the pixels in the column. An implementation of an electronic rolling shutter is shown in FIG. 4 by lines 62. The direction of the electronic rolling shutter is determined by the direction of column select signals (e.g., signals that cause column select transistors in a column to connect source-follower transistors in that column to image readout circuitry 52 through row readout lines), transfer signals (e.g., signals that cause transfer transistors to transfer image charges from photodiodes to floating diffusions in the pixel in a column), and reset signals (e.g., signals that cause reset transistors to reset floating diffusions and/or photodiodes by connecting the floating diffusions to one or more reset lines).

As shown in FIG. 4, image processing and data formatting circuitry 16, which may be connected to stereo camera sensor 14 over path 26 and may be connected to host subsystem 20 over path 18, can include memory buffer circuitry 60. If desired, memory buffer circuitry 60 may be implemented as a double frame memory buffer (e.g., memory buffer circuitry 60 may butler a first frame in portion 60A and may butler a second frame in portion 60B). When memory buffer circuitry 60 is implemented as a double frame memory buffer, memory buffer circuitry 60 has a storage capacity that is sufficient to simultaneously store two complete stereo images from stereo sensor 14 (with each stereo image including an image from array 44 and an image from array 46 so that the two complete stereo images include four non-stereo images). Each frame buffered by memory buffer circuitry 60 may include image data from array 44 and image data from array 46 (e.g., each frame buffered in circuitry 60 may include two images, a first image from array 44 and a second image from array 46). With this type of arrangement, memory buffer circuitry 60 may be configured to convert non-raster-scan-compliant image data (e.g., image and video data associated with an electronic rolling shutter that moves horizontally) that is received from stereo camera sensor 14 over path 26 into raster-scan compliant image data (e.g., image and video data associated with an electronic rolling shutter that moves vertically) that is provided to host subsystem 20 over path 18. This type of arrangement may allow camera module 12 to be implemented in a host subsystem that prefers raster-scan compliant data.

Memory buffer circuitry 60 may be implemented as a single memory array or as multiple memory arrays (e.g., portion 60A may be implemented as a first memory array and portion 60B may be implemented as a second memory array). If desired, memory buffer circuitry 60 may be dual-port memory that allows non-raster-scan image data to be written into circuitry 60 while raster-scan image data is being read out from circuitry 60.

In the example of FIG. 4, portion 60B of memory buffer circuitry 60 is actively receiving image data from arrays 44 and 46 using a write operation that moves horizontally as shown by line 64 (and that mirrors the horizontal electronic rolling shutter shown by lines 62). Image'data is being actively read out of portion 60A of memory buffer circuitry 60 and forwarded to host subsystem 20 using a read operation that moves vertically as shown by line 66 (in a raster-compliant arrangement).

Memory buffer circuitry is one potential way in which non-raster-scan image and video data from sensory 14 may be converted into raster-scan image and video data. This type of arrangement may allow a horizontal rolling shutter to be used to control sensor array 14, thereby facilitating the placement of image readout circuitry 52 between arrays 44 and 46.

Figure 5:
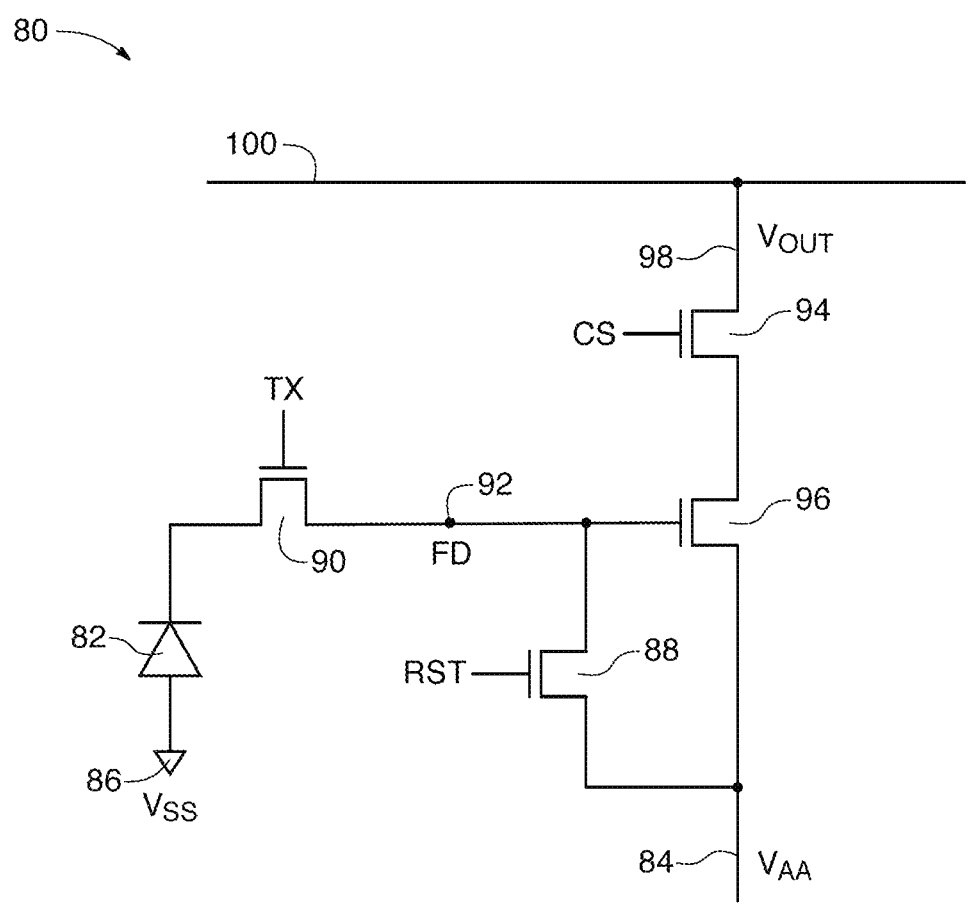
FIG. 5 is a diagram of an illustrative pixel in an image sensor such as an integrated stereo sensor of the type shown in FIG. 4 in accordance with an embodiment of the present invention.

Circuitry in an illustrative pixel that may be used to implement arrays 44 and 46 of FIG. 4 is shown in FIG. 5. As shown in FIG. 5, pixel 80 includes a photosensitive element such as photodiode 82. A positive power supply voltage (e.g., voltage $V_{AA}$) may be supplied at positive power supply terminal 84. A ground power supply voltage (e.g., voltage $V_{SS}$) may be supplied at ground terminal 86. Incoming light is collected by photodiode 82 after passing through an optional color filter structure. Photodiode 82 converts the light to electrical charge.

Before an image is acquired, reset control signal RST may be asserted. This turns on reset transistor 88 and resets charge storage node 92 (also referred to as floating diffusion FD) to $V_{AA}$. The reset control signal RST may then be deasserted to turn off reset transistor 88. Reset control signal RST may be generated by address circuitry 48 and 50 or, if desired, may be generated by image readout circuitry 52.

After the reset process is complete, column select control signal CS can be asserted to sample the reset value of node 92 (if implementing a correlated double sampling readout scheme). Column select control signal CS may be generated by address circuitry 48 and 50 or, if desired, by image readout circuitry 52. Subsequently, transfer gate control signal TX may be asserted to turn on transfer transistor (transfer gate) 90. Transfer gate control signal TX may be generated by address circuitry 48 and 50 or, if desired, by image readout circuitry 52. When transfer transistor 90 is turned on, the charge that has been generated by photodiode 82 in response to incoming light is transferred to charge storage node 92. The signal associated with the stored charge on node 92 is conveyed to column select transistor 94 by source-follower transistor 96. When it is desired to read out the value of the stored charge (i.e., the value of the stored charge that is represented by the signal at the source of transistor 96), column select control signal CS can be asserted. When signal CS is asserted, transistor 94 turns on and a corresponding signal $V_{OUT}$ that is representative of the magnitude of the charge on charge storage node 92 is produced on output path 98. In a typical configuration, there are numerous rows and columns of pixels 80 in arrays 44 and 46 (FIG. 4). A horizontal conductive path such as path 100 can be associated with each row of pixels. When signal CS is asserted in a given column, the paths 100 associated with all of the rows of pixels 80 can be used to route signals $V_{OUT}$ from the pixels 80 in that column to readout circuitry 52.

Charge storage node 92 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 82. To ensure good conversion gain for pixel 80, it is generally desirable for the magnitude of the capacitance (mainly composed of floating diffusion capacitance and parasitic capacitance) to be matched with the number of photoelectrons that can be held in a photodiode.

Figure 6:
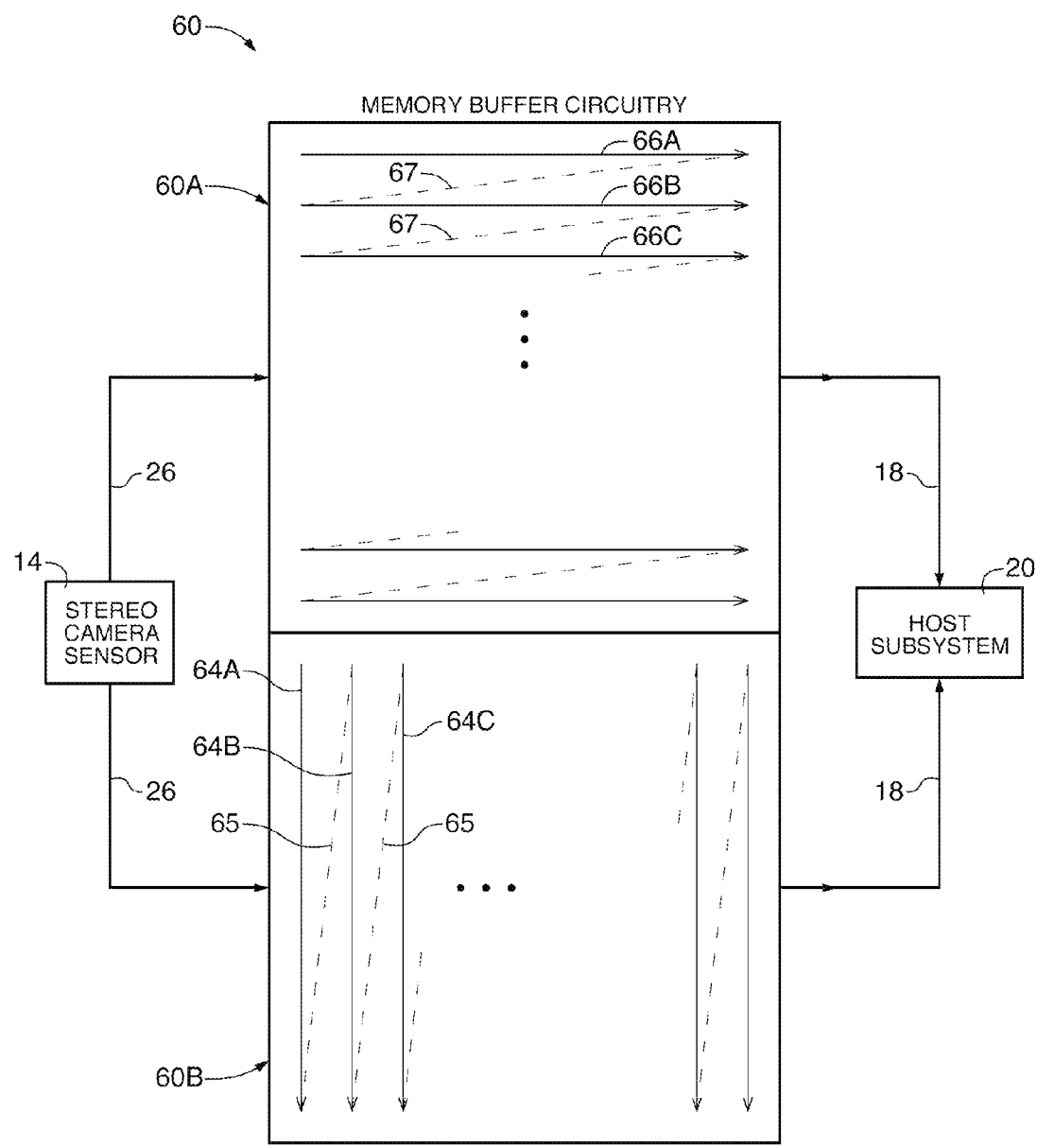
FIG. 6 is a diagram of illustrative memory buffer circuitry that may buffer and convert non-raster-scan image data to raster-scan image data in accordance with an embodiment of the present invention.

An illustration of image and video data being converted from non-raster-scan data to raster-scan data by memory buffer circuitry 60 of FIG. 4 is shown in FIG. 6. As shown in FIG. 6, non-raster-scan data can be buffered into portion 60B as the non-raster-scan data is read out from sensor 14. The non-raster-scan data, which may be read out of arrays 44 and 46 using a horizontal electronic rolling shutter, can be written into portion 60B of circuitry 60 using a write pointer that writes a column of data into memory circuitry 60 (e.g., one of columns 64A, 64B, 64C, etc.) then (as shown by dotted lines 65) writes in the next column. Raster-scan data can be read out of portion 60A of circuitry 60 using a read pointer that reads a row of data out of memory circuitry 60 (e.g., one of the rows 66A, 66B, 66C, etc.) then (as shown by dotted lines 67) reads out the next row.

While some host subsystems 20 may be capable of receiving the non-raster-scan data, many host subsystems 20 prefer raster-scan-compliant data, which is a format used by various types of displays. Once a complete frame is loaded into buffer circuitry 60, the frame can be read out and provided to host subsystem 20 in a raster-scan-compliant format (as shown in portion 60A of buffer circuitry 60). Typically, image data is buffered into a first half of buffer circuitry 60 while, simultaneously, image data is read out form the second half. The roles of each half of buffer circuitry may be swapped after each iteration (e.g., after each new frame has been completed buffered and the previous frame has been completely read out).

Figure 7:
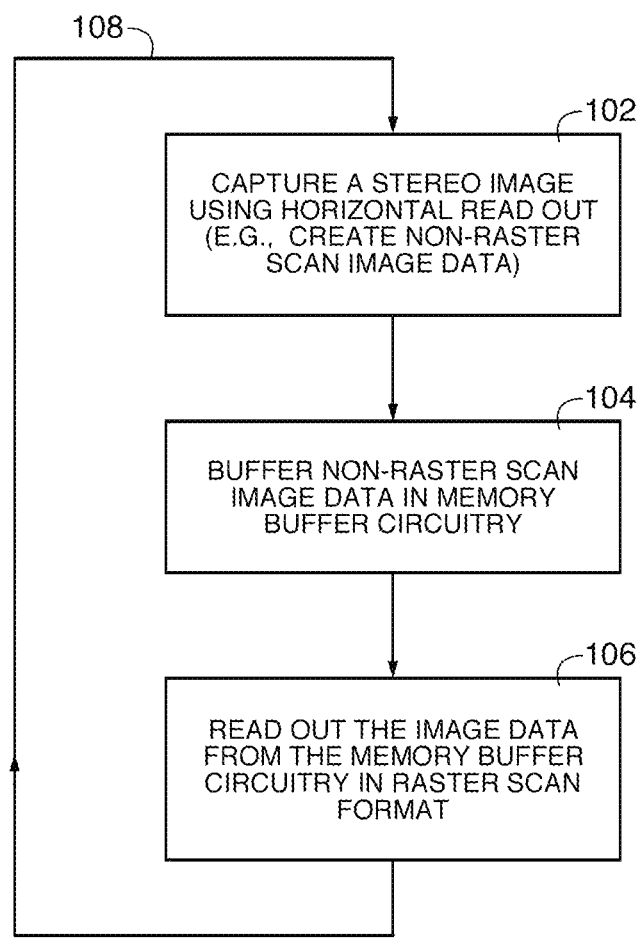
FIG. 7 is a flow chart of illustrative steps involved in converting non-raster-scan image data from a stereo sensor array of the type shown in FIG. 4 to raster-scan image data using memory buffer circuitry of the type shown in FIG. 6 in accordance with an embodiment of the present invention.

A flow chart of illustrative steps involved in converting non-raster-scan image data from arrays 44 and 46 to raster-scan image data using memory buffer circuitry 60 is shown in FIG. 7.

In step 102, a stereo image may be captured by arrays 44 and 46. Arrays 44 and 46 may each capture an entire frame to form the stereo image. The stereo image may be captured using a horizontal electronic rolling shutter and may therefore be output from the arrays 44 and 46 in a non-raster-scan-compliant image format.

In step 104, the frames captured by arrays 44 and 46 may be buffered in memory buffer circuitry 60. In particular, the non-raster-scan-compliant image data may be buffered in memory buffer circuitry 60.

In step 106, after the stereo image is buffered in memory buffer circuitry 60, the stereo image may be read out from the memory buffer circuitry in a raster-scan-compliant image data format (and provided to host subsystem 20).

The timing of the operations of steps 102, 104, and 106 may overlap. For example, while a given stereo image is being captured in step 102 and is being output from arrays 44 and 46, non-raster-scan image data associated with the given stereo image may be buffered into memory buffer circuitry 60 in step 104 (e.g., as the given stereo image is being output from arrays 44 and 46), and raster-scan image data associated with a preceding stereo image may be read out from memory buffer circuitry 60 in step 106.

If desired, the operations of steps 102, 104, and 106 may be repeated as shown by line 108. For example, the steps of 102, 104, and 106 may be repeated when stereo camera sensor 14 is used in capturing video.

The foregoing is merely illustrative of the principles of this invention which can be practiced in other embodiments.

What is claimed is:

1. A stereoscopic camera module for an electronic device, the stereoscopic camera module comprising:
    an integrated circuit that comprises:
        a first array of image sensing pixels arranged in columns and rows;
        a second array of image sensing pixels arranged in columns and rows; and
        image readout circuitry located between the first and second arrays using a horizontal electronic rolling shutter that reads image data out of the first and second arrays by reading out image data from individual columns of image sensing pixels over horizontal output line, wherein each of the horizontal output lines is coupled to the image sensing pixels in a respective one of the rows of the first and second arrays;
        a first address circuit that generates column select signals that couple a selected one of the columns of image sensing pixels in the first array to the image readout circuitry; and
        a second address circuit that generates column select signals that couple a selected one of the columns of image sensing pixels in the second array to the image readout circuitry.

2. The stereoscopic camera module defined in claim 1 further comprising:
    memory buffer circuitry that is coupled to the integrated circuit, that receives non-raster-scan image data from the first and second arrays of image sensing pixels, and that outputs raster-scan image data.

3. The stereoscopic camera module defined in claim 2 wherein the memory buffer circuitry comprises double frame memory buffer circuitry that has a storage capacity sufficient to simultaneously store two complete stereo images from the first and second arrays of image sensing pixels.

4. An electronic device comprising:
    an imaging system that comprises:
        a first array of image sensing pixels;
        image readout circuitry that reads non-raster-scan image data image data out of the first array with a horizontal electronic rolling shutter; and
        memory buffer circuitry that buffers the non-raster-scan image data using a first portion of the memory buffer circuitry and converts the non-raster-scan image data into raster-scan compliant image data that is read out from a second portion of the memory buffer circuitry that is different than the first portion of the memory buffer circuitry.

5. The electronic device defined in claim 4 wherein the imaging system further comprises a second array of image sensing pixels and wherein the image readout circuitry reads non-raster-scan image data out of the second array with a horizontal electronic rolling shutter.

6. The electronic device defined in claim 5 wherein the electronic device comprises an endoscope having an elongated housing.

7. The electronic device defined in claim 5 wherein the first array, the second array, and the image readout circuitry are located on an integrated circuit.

8. The electronic device defined in claim 7 wherein the image readout circuitry is located between the first and second arrays on the integrated circuit.

9. The electronic device defined in claim 8 wherein the image sensing pixels are arranged in columns and rows in the first and second arrays and wherein the integrated circuit comprises:
   a first address circuit that generates column select signals that couple a selected one of the columns of image sensing pixels in the first array to the image readout circuitry; and
   a second address circuit that generates column select signals that couple a selected one of the columns of image sensing pixels in the second array to the image readout circuitry.

10. The electronic device defined in claim 7 wherein the electronic device comprises a first portion that is disposable and a second portion that is reusable, wherein the first and second portions are nondestructively coupled together, wherein the integrated circuit is located within the first portion, and wherein the memory buffer circuitry is located within the second portion.

11. The electronic device defined in claim 5 wherein the memory buffer circuitry comprises double frame memory buffer circuitry that has a storage capacity sufficient to simultaneously store two complete stereo images from the first and second arrays of image sensing pixels.

12. The electronic device defined in claim 5 wherein the image readout circuitry comprises a plurality of analog-to-digital converters.

13. A method for producing raster-scan compliant images using a sensor array that is read out using a horizontal electronic rolling shutter, the method comprising:
   with the sensor array, generating non-raster-scan image data associated with a given image;
   with memory buffer circuitry, buffering the non-raster-scan image data associated with the given image, wherein the memory buffer circuitry comprises double frame memory buffer circuitry;
   after the non-raster-scan image data associated with the given image is buffered in the memory buffer circuitry, outputting raster-scan image data associated with the given image using the memory buffer circuitry; and
   while the raster-scan image data associated with the given image is being outputted, generating non-raster-scan image data associated with a second given image using the sensor array.

14. The method defined in claim 13 further comprising:
   while the raster-scan image data associated with the given image is being outputted, buffering the non-raster-scan image data associated with the second given image with the double frame memory buffer circuitry; and
   after the non-raster-scan image data associated with the second given image is buffered in the memory buffer circuitry and after the raster-scan image data associated with the given image is outputted, outputting raster-scan image data associated with the second given image with the double frame memory buffer circuitry.

15. The method defined in claim 13 wherein the sensor array comprises first and second sensor arrays on an integrated circuit, wherein the integrated circuit comprises image readout circuitry located between the first and second arrays, wherein image sensing pixels in the first and second arrays are arranged in columns and rows, and wherein generating the non-raster-scan image data associated with the given image with the sensor array comprises:
   using a horizontal electronic rolling shutter to read image data from the columns of the image sensing pixels one column at a time.

* * * * *